G. WEBER.
TROLLEY.
APPLICATION FILED JUNE 17, 1909.

970,865.

Patented Sept. 20, 1910.
2 SHEETS—SHEET 1.

Witnesses
G. L. Farrington,
R. H. Butler

Inventor
G. Weber.
By H. C. Evert
Attorneys

THE NORRIS PETERS CO., WASHINGTON, D. C.

G. WEBER.
TROLLEY.
APPLICATION FILED JUNE 17, 1909.

970,865.

Patented Sept. 20, 1910.

2 SHEETS—SHEET 2.

Witnesses
G. L. Farrington
L. A. Butler

Inventor
G. Weber
By H. C. Everett
Attorneys

UNITED STATES PATENT OFFICE.

GEORGE WEBER, OF MOUNT OLIVER, PENNSYLVANIA, ASSIGNOR OF ONE-TENTH TO ADOLPH KIEFER, OF PITTSBURG, PENNSYLVANIA.

TROLLEY.

970,865.  Specification of Letters Patent. Patented Sept. 20, 1910.

Application filed June 17, 1909. Serial No. 502,772.

*To all whom it may concern:*

Be it known that I, GEORGE WEBER, a citizen of the United States of America, residing at Mount Oliver, in the county of Allegheny and State of Pennsylvania, have invented certain new and useful Improvements in Trolleys, of which the following is a specification, reference being had therein to the accompanying drawing.

This invention relates to trolleys, and the invention has for its object, first, to provide a trolley harp with a plurality of wheels, one or two of which are adapted to always engage a trolley wire or electrical conductor; second, to furnish a trolley harp with simple and effective means for normally maintaining one of the wheels thereof in engagement with a trolley wire; third, to provide a strong and durable trolley that can be used in connection with various types of street cars and overhead systems; and fourth, to provide a harp that will not interfere with trolley hangers, guards and similar overhead structures, the harp being designed to normally travel upon a trolley wire, irrespective of the curvature and irregularities that may be encountered.

With the above and other objects in view which will more readily appear as the invention is better understood, the same consists in the novel construction, combination and arrangement of parts to be hereinafter described, and then claimed.

Figure 1:
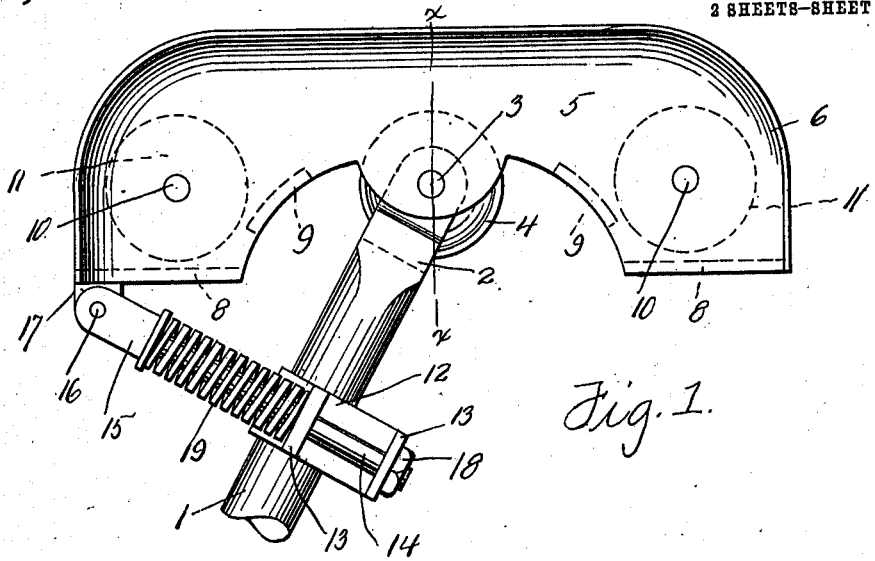
Figure 2:
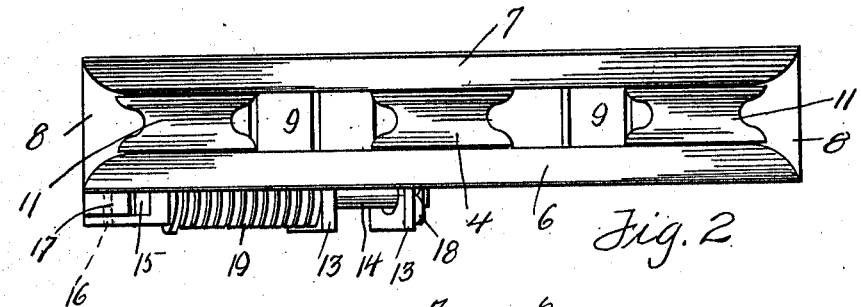
Figure 3:
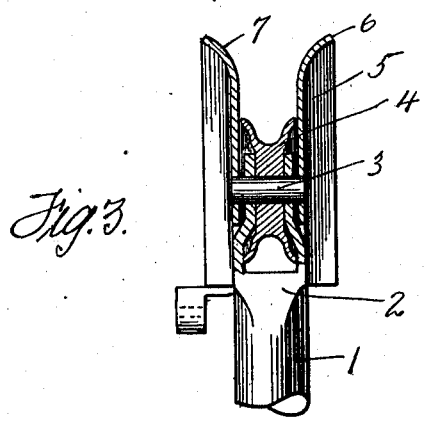
Figure 4:
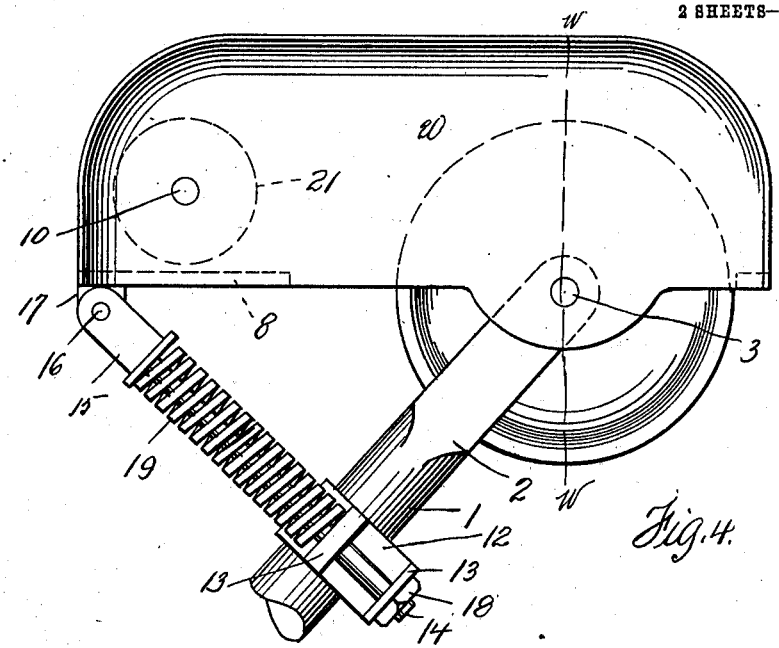
Figure 5:
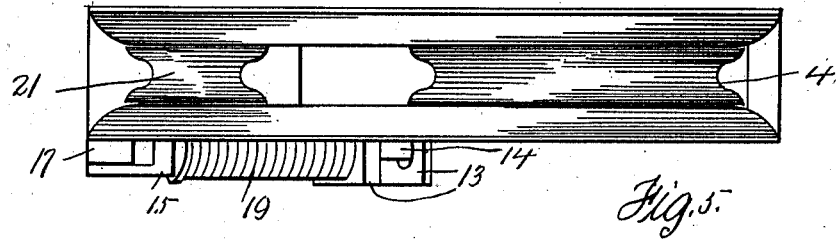
Figure 6:
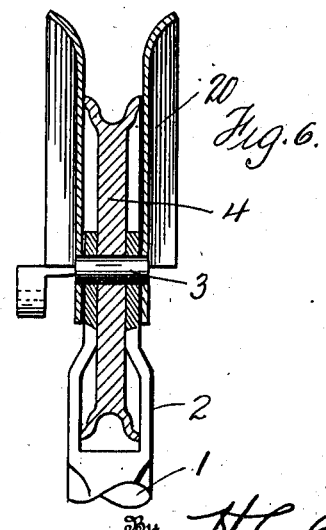

In the drawings:—Figure 1 is an elevation of a trolley constructed in accordance with my invention, Fig. 2 is a plan of the same, Fig. 3 is a vertical sectional view of the trolley taken on the line $x$—$x$ of Fig. 1, Fig. 4 is a side elevation of a modified form of trolley, Fig. 5 is a plan of the same, and Fig. 6 is a vertical sectional view of the trolley, taken on the line $w$—$w$ of Fig. 4.

In the accompanying drawings, 1 designates a trolley pole having the upper end thereof bifurcated to provide a harp 2 in which is mounted a transverse pin 3 for a revoluble trolley wheel 4. The ends of the pin 3 protrude from the outer sides of the harp 2 and support vertical parallel guards 5, said guards having the ends thereof rounded, as at 6, and the upper edges thereof flared outwardly, as at 7, whereby the trolley can be easily placed in engagement with a trolley wire. The guards 5 have the outer and lower ends thereof connected by plates 8 and intermediate said ends by straps 9, said straps being located adjacent to the inner sides of the plates 8. The ends of the guards 5 are provided with transverse pins 10, and revolubly mounted upon said pins are trolley wheels 11, similar to the wheel 4.

Mounted upon the pole 1 adjacent to the harp 2 is a two-part clamp 12 having apertured extensions 13 for a movable rod 14. The upper end of this rod is provided with a bifurcated head 15 pivotally connected by a pin 16 to a depending bracket 17 carried by the plate 8 at the forward end of the trolley. The lower end of the rod 14 is provided with a nut 18 for preventing the rod from becoming accidentally disengaged from the apertured extensions 13 of the clamp 12. Encircling the rod 14 between one of said extensions and the head 15 is a coil spring 19, said spring normally supporting the guards 5 in a horizontal position, whereby the trolley wheels 4 and 11 can travel upon a trolley wire.

In Figs. 4 to 6 inclusive, a modification of the invention is shown consisting in using guards approximately half the length of the guard shown in Figs. 1 and 2. The modified form of guards, which I have designated 20, extend forwardly, and are provided with a single trolley wheel 21. The forward ends of the guards are supported by the same yielding device shown in Figs. 1 and 2.

It is thought that the operation and utility of the trolley will be understood without further description, and while in the drawings there is illustrated the preferred embodiments of my invention, it is obvious that the structural elements thereof can be varied or changed in a manner which will fall within the scope of the claims hereunto appended.

Having now described my invention what I claim as new, is:—

1. In a trolley, the combination with a trolley pole, a pin carried by said pole and a trolley wheel journaled upon said pin, of guards carried by the ends of said pin, said guards having the ends thereof rounded, and the upper edges thereof flared outwardly, horizontal plates connecting the ends of said guards, trolley wheels revolubly mounted between the ends of said guards and adapted to coöperate with the trolley wheel of said pole, and a yieldable device connected to said pole and to the forward end of said guards for normally supporting said guards in a horizontal position.

2. In a trolley, the combination with a trolley pole, a pin carried by said pole and a trolley wheel journaled upon said pin, of guards carried by the ends of said pin, said guards having the ends thereof rounded, and the upper edges thereof flared outwardly, horizontal plates connecting the ends of said guards, trolley wheels revolubly mounted between the ends of said guards and adapted to coöperate with the trolley wheel of said pole, a yieldable device connected to said pole and to the forward end of said guards for normally supporting said guards in a horizontal position, said yieldable device comprising a clamp carried by said pole and having apertured extensions, and a spring held rod mounted in said apertured extensions and connecting with the forward ends of said guards.

In testimony whereof I affix my signature in the presence of two witnesses.

GEORGE WEBER.

Witnesses:
A. H. RABSÁG,
ADOLPH KIEFER.